United States Patent
Wilkes et al.

(10) Patent No.: US 8,528,687 B2
(45) Date of Patent: Sep. 10, 2013

(54) WORM GEAR FOR ELECTRIC ASSISTED STEERING APPARATUS AND METHOD CONTROLLING THE MOVEMENT OF THE WORM SHAFT IN A WORM GEARING

(75) Inventors: Mark Anthony Wilkes, Birmingham (GB); Michael Appleyard, Cheltenham (GB)

(73) Assignee: TRW Limited, West Midlands (GB)

( * ) Notice: Subject to any disclaimer, the term of this patent is extended or adjusted under 35 U.S.C. 154(b) by 791 days.

(21) Appl. No.: 12/513,226

(22) PCT Filed: Nov. 2, 2007

(86) PCT No.: PCT/GB2007/004183
§ 371 (c)(1),
(2), (4) Date: Feb. 16, 2010

(87) PCT Pub. No.: WO2008/053226
PCT Pub. Date: May 8, 2008

(65) Prior Publication Data
US 2010/0140011 A1    Jun. 10, 2010

(30) Foreign Application Priority Data

Nov. 4, 2006 (GB) .................................. 0621985.1
Dec. 20, 2006 (GB) .................................. 0625359.5

(51) Int. Cl.
*B62D 5/04*    (2006.01)
*F16H 55/18*   (2006.01)

(52) U.S. Cl.
USPC .............................. 180/444; 74/409; 180/443

(58) Field of Classification Search
USPC ........... 180/443, 444, 446; 74/409; 308/193, 308/188, 190, 194
See application file for complete search history.

(56) References Cited

U.S. PATENT DOCUMENTS

| | | |
|---|---|---|
| 2,644,341 A | 7/1953 | Rabe |
| 2004/0222036 A1 | 11/2004 | Berhard et al. |
| 2006/0117883 A1* | 6/2006 | Yasuda et al. ............. 74/388 PS |

FOREIGN PATENT DOCUMENTS

EP    1433688 A2    6/2004

(Continued)

OTHER PUBLICATIONS

UK Intellectual Property Office Report for GB0621985.1 dated Dec. 4, 2006.

(Continued)

*Primary Examiner* — Tony H. Winner
*Assistant Examiner* — Jacob Knutson
(74) *Attorney, Agent, or Firm* — MacMillan, Sobanski & Todd, LLC

(57) ABSTRACT

An electric power assisted steering system comprises a motor connected to a portion of a steering mechanism through a worm carried by a worm shaft and a wheel carried by an output shaft operatively coupled to the steering mechanism. The shaft is supported in at least one bearing which has some internal clearances and supports the worm shaft in such a manner that it is free to pivot through an angle in planes which include its own axis due to a degree of axial free play of the first bearing assembly. The bearing assembly comprises an inner race having a groove, an outer race having a groove, and a plurality of ball bearings located between the inner and outer races, and in which the outer race groove is not round when in its position of use such that the ball bearings permit a greater freedom of movement of the inner race relative to the outer race in a first radial direction than in a second radial direction that is orthogonal to the first direction. Tensile or compressive forces may be applied to the bearing assembly to cause the part of the assembly to become not round.

19 Claims, 12 Drawing Sheets

(56) References Cited

FOREIGN PATENT DOCUMENTS

| JP | 10281235 A | 10/1998 |
| JP | 2001108025 A | 4/2001 |
| JP | 2006151043 A | 6/2006 |

OTHER PUBLICATIONS

International Search Report to PCT/GB2007/004183 dated Feb. 6, 2008.

* cited by examiner

Before Distortion

With Distortion

WORM GEAR FOR ELECTRIC ASSISTED STEERING APPARATUS AND METHOD CONTROLLING THE MOVEMENT OF THE WORM SHAFT IN A WORM GEARING

CROSS REFERENCE TO RELATED APPLICATIONS

This application is a National Stage of International Application No. PCT/GB2007/004183 filed Nov. 2, 2007, the disclosures of which are incorporated herein by reference in entirety, and which claimed priority to Great Britain Patent Application No. 0621985.1 filed Nov. 4, 2006, and Great Britain Patent Application No. 0625359.5 filed Dec. 20, 2006 the disclosures of which are incorporated herein by reference in entirety.

BACKGROUND OF THE INVENTION

This invention relates to improvements in electric power assisted steering apparatus and in particular to gearbox assemblies for use in electric power assisted steering systems of the kind which incorporate a worm and wheel gear assembly for transferring torque from an electric motor to a steering shaft or output shaft operatively connected thereto.

It is known to provide a power steering system for a vehicle comprising an electric motor having a stator and a rotor, an input shaft operatively connected to the rotor and adapted to rotate therewith, an output shaft associated with a steering shaft, and a gearbox adapted to transfer torque from the input shaft to the output shaft in response to a measure of the torque in the output shaft as produced by a torque sensor. The motor is typically operated to apply an increasing torque to the output shaft as the measured torque increases, thus applying assistance that helps reduce the effort needed to steer the vehicle.

In a simple arrangement the input shaft carries a worm gear, and the output shaft carries a wheel gear. The teeth of the worm and wheel intermesh to transfer the torque. This system is simple and robust whilst providing relatively high gearing with a low component count. There exists, however, a problem in such gearboxes with noise and vibration due to incorrect meshing between the worm and wheel.

A worm and wheel gearbox, for an electric power steering system, having a fixed centre distance between the axes of the worm and gear wheel is prone to rattle when transmitting zero or low torque if there is excessive clearance between the gear teeth of the worm and those of the gear wheel. Alternatively, it is prone to having high friction if there is forced meshing between the worm and wheel due to interference between the teeth.

BRIEF SUMMARY OF THE INVENTION

According to a first aspect of the invention there is provided an electric power assisted steering system of the kind in which a motor is connected to a portion of a steering mechanism through a worm carried by a worm shaft and a wheel carried by an output shaft operatively coupled to the steering mechanism, the shaft being supported in at least one bearing, in which the bearing assembly having some internal clearances supports the worm shaft in such a manner that it is free to pivot through an angle in planes which include its own axis due to a degree of axial free play of the first bearing assembly, and further in which the bearing assembly comprises an inner race having a groove, an outer race having a groove, and a plurality of ball bearings located between the inner and outer races, and in which the outer race groove is not round when in its position of use such that the ball bearings permit a greater freedom of movement of the inner race relative to the outer race in a first radial direction than in a second radial direction that is orthogonal to the first direction.

It should be noted that in a conventional ball bearing the existence of radial clearance between the balls and the races also results in them having some axial free play. This axial free play is what allows the pivoting movement of the worm shaft. The pivoting movement has its fulcrum at the centre of the bearing.

By providing differing degrees of radial freedom through use of a non-round outer bearing race groove it has been found to be possible to permit a relatively large angular movement of the worm shaft predominantly in one desired plane whilst restricting the angular movement in the plane orthogonal to the desired plane whilst restricting the amount of axial movement of the worm shaft. For a worm and wheel gearbox in an electric power assisted steering system the desired plane is usually that which passes through both the axis of the worm shaft and intersects the teeth of the gear wheel halfway across their width. This combination is good for reducing unwanted noise.

The bearing assembly may comprise a single race deep ball groove ball bearing. The desired properties of no axial freedom and freedom to pivot are normally mutually exclusive in a single race deep ball groove ball bearing. The arrangement of the present invention achieves this combination by distorting the outer race groove of the bearing such that it becomes slightly oval.

When in its position of use the outer race may adopt an eccentric shape such as an oval, whilst the other race may remain substantially circular. They may be arranged about a common axis as is well known in the art of bearing manufacture. The outer race may deviate from a perfect round shape by between 3 and 30 micro meters depending on what are the radial clearances that exist between the balls and the races when the outer race of the same circumferential length is constrained to be a perfect circular shape. The objective is to remove the radial clearance of the ball bearings in the second direction. The deviation from roundness is not that which may arise randomly due to manufacturing tolerances. Furthermore the substantially oval shape of the outer ring due to the deviation must be correctly orientated within the gearbox in order to produce the desired function.

Where the outer race is oval, its long axis may lie in the same plane in which the shaft moves when pivoting.

The bearing may include an outer race which is flexible and which is generally circular prior to use and is distorted when in use by applying forces to it. The inner race should preferably be as circular as possible to avoid unwanted changes in the distribution of ball clearances as the inner race rotates.

The deviation from roundness must be matched to the requirements of each individual bearing and should ideally take in to account the exact radial clearances of the balls which will be subject to variations due to manufacturing tolerances. The matching may be achieved by making an adjustment to the amount of distortion imposed on the bearing after it has been assembled into the gearbox housing. T Adjustment means may be provided that is adapted to adjust the eccentricity of the outer bearing. It may comprise a variable displacement device such as a screw. Alternatively it may apply a substantially fixed level of force which is sufficient to eliminate the ball clearances in the plane in which the force acts for all bearings that are within permitted tolerance range of clearances. The deviation from circular must be orientated in the gearbox housing to produce desired singular plane of pivoting motion of the worm shaft.

The bearing may include an outer race which is flexible and a force applying means may be provided for squeezing towards one another opposing sides of the outer race when in their position of use to permit a greater free play of the shaft in a direction orthogonal to the direction in which it is squeezed than in the direction in which it is squeezed.

The opposing sides may be squeezed together by providing the outer race within a bore of a housing, the bore having an inner wall, and providing a force applying means that passes at least partially through an opening in the wall of the bore and which acts between the housing and a portion of the outer race so as to compress the outer race onto the wall of the bore opposing the force applying means.

The force applying means may comprise a screw working in a threaded bore that extends outwards from the wall of the bore.

Instead of a screw it may comprise an actuator. The actuator may comprise one or more electromagnetic devices such as a solenoid(s) or a motor-driven mechanism(s) that apply compressive forces to the outer ring of the bearing. It may comprise one or more piezo-electric devices that apply compressive forces to the outer ring of the bearing.

The screw may be combined with an actuator which is adapted to rotate the screw in the bore to permit the amount of compression to be adjusted by operation of the actuator. The actuator may be a motor.

The screw or actuator may act directly onto the outer race through the opening in the wall in the bore. Alternatively, they may act on the outer race through an intermediate member. This may comprise a plunger within the bore. It may comprise a spring such as a coil spring. It may comprise a coil spring and a plunger in series.

The force applying means may comprise a spring which may be a coil spring, a leaf spring or perhaps an elastomeric spring, acting directly on the bearing or via some mechanical linkage.

More than one force applying means may be provided. For example, two screws could be provided at spaced locations with the outer bearing being squeezed between the two.

In a still further alternative it may be squeezed by locating the bearing in a recess which is so dimensioned that the recess deforms the bearing.

In this arrangement, the recess may be oval. Alternatively, it may be a circular recess which may be provided with one or more inwardly directed protrusions whose spacing is such that the required squeezing is applied by at least one of the protrusions.

When squeezing the bearing it is most preferred that the force is applied across a diameter of the outer race. However, the forces could be applied in a non-diametrical manner by applying the force to points which lie at opposite ends of a chord that does not pass through the centre of rotation of the bearing.

The bearing may include an outer race that is flexible and in which opposing portions of the outer race are drawn apart such as to distort the outer race into a non round form The main bearing may be located in a recess in a gearbox housing with just sufficient radial clearance to allow it to be distorted into a slight ovoid shape to remove the radial clearance in the plane of the compression. Typically this requires a radial deflection of the outer race, in this plane, by which we mean a line passing the two points at which the bearing is squeezed pass through its axis.

In another alternative, the bearing could be manufactured such that the ball groove in the outer race is non-round thus avoiding the requirement to distort it after installation in the gearbox housing. This requires the correct orientation of the outer race in the gearbox housing to ensure that the freedom to pivot is in the correct plane.

Alternatively, the outer surface of the outer ring could be manufactured non-circular so that its internal ball groove is distorted into the desired ovoid shape upon installation into an interference bore in the gearbox housing. This requires the correct orientation of the outer race in the gearbox housing to ensure that the freedom to pivot is in the correct plane.

The distortion of the outer race when squeezed wrt when not squeezed may typically be of the order of 3 to 30 micrometres.

Preferably, the orientation is such that the major axis of the ovoid is in the plane of the required freedom to allow the wormshaft to pivot. In the plane of the minor axis there will be almost no freedom to pivot.

However, if it is desired, the plane of compression can be offset by a small amount from the axis of the worm shaft and/or rotated out of parallel with the axis of the wheel.

Various other force applying means for squeezing of the outer race are possible, a non exhaustive list including the following:

Mounting the bearing in an elastic material such that varying radial compressive forces are generated around the circumference of the bearing. [An example would be an O-ring of varying cross-section.]

One or more cams, other eccentric devices or tapered devices that bear radially on the outer race of the bearing.

One or more hydraulic or pneumatic devices may be provided that apply compressive forces to the outer ring of the bearing.

One or more electromagnetic devices such as a solenoid(s) or a motor-driven mechanism(s) that apply compressive forces to the outer ring of the bearing.

One or more piezo-electric devices that apply compressive forces to the outer ring of the bearing.

One or more ball-and-ramp devices that apply compressive forces to the outer ring of the bearing.

One or more devices in which a rachet mechanism is employed to adjust the distortion of the outer ring to the desired amount.

One or more devices that can substantially vary the pressure applied to the outer ring of the bearing due to a temperature change.

One of more devices that apply a force or pressure at defined point(s) on the outer ring of the bearing by means of a wire or fibre.

Mounting the bearing into the gearbox housing and injecting material(s) such as metal, metal amalgam, plastic, resin, glue or wax into cavities between the bearing outer ring and the housing in order to distort the outer ring.

One or more shims that are forced between the outer ring of the bearing and a locating recess for the bearing in the gearbox housing.

One or more wedged shaped devices that are forced between the outer ring of the bearing and the gearbox housing.

Mounting the bearing into a shaped carrier which distorts the outer ring of the bearing into the desired ovoid shape when the carrier is inserted into the gearbox housing.

Mounting a shaped spacer into the gearbox housing which distorts the outer ring of the bearing into the desired ovoid shape when the bearing is inserted into the spacer.

One or more devices that distort the gearbox housing in the region that supports the main worm shaft bearing in such a way as to distort the outer ring of the bearing into the desired ovoid shape upon fitting it into the housing.

Providing a wedge in a blind bore which is biased by a spring in the base of the bore into engagement with a further wedge nearer the opening of the bore, the first wedge being biased by the spring into engagement with the outer circumference of the bearing so as to apply a compressive force to the bearing.

Providing a leaf spring which may act on the outer face of the bearing to compress it into a not round shape, the spring being fixed to the gearbox housing and acting on the bearing through a bore in the housing.

It will be understood that any of the above means which can be used to provide tensile radial forces to the outer ring of the bearing to stretch it, possibly in combination with mechanical features specially added or already extant in the outer ring which would allow those forces to be applied; for example grooves or holes on the end faces of the outer ring or tapped holes on the circumference or the end faces of the outer ring.

The bearing may be located within a bore with one face engaging a step which may be defined by the base of the bore (where a blind bore is provided) to prevent it from moving axially. It may be located within the bore by a cap which engages the opposing face of the bearing.

The cap may comprise resilient circlip which has an inclined conical face formed in one of its side faces that engages with a similarly inclined conical face on one side of the groove in the gearbox housing whereby upon assembly into the groove, the circlip expands until there is no axial gap between its inclined face and that of the groove nor between its vertical face and that of the bearing.

Alternatively, the cap may comprise a plate which extends across the end of the recess and which engages the bearing through a resilient O-ring. A further O-ring may be provided between the other face of the bearing and the step in the recess. The plate may be secured to the housing by one or more screws or bolts. The resilience of the O-rings holds the bearing against axial movement yet the small contact area allows the bearing to move radially.

According to a second aspect of the invention there is provided an electric power assisted steering system of the kind in which a motor is connected to a portion of a steering mechanism through a worm carried by a worm shaft and a wheel carried by an output shaft operatively coupled to the steering mechanism, the shaft being supported in at least one bearing, in which the bearing assembly supports the worm shaft in such a manner that it is free to pivot through an angle due to a degree of axial free play of the first bearing assembly, and further in which the bearing assembly comprises an inner race having a groove, a flexible outer race having a groove, and a plurality of bearings located between the inner and outer races, and in which at least the groove of the outer race is distorted into a not round shape by applying compressive forces at spaced locations around the circumference of the outer bearing race.

The compressive forces may be applied at two spaced location, which may be diametrically opposite sides of the axis of rotation of the inner race.

The outer race may deviate from a perfect round shape by between 3 and 30 micro meters.

According to a third aspect of the invention there is provided an electric power assisted steering system of the kind in which a motor is connected to a portion of a steering mechanism through a worm carried by a worm shaft and a wheel carried by an output shaft, the worm shaft being supported in at least one bearing, in which the bearing assembly supports the worm shaft in such a manner that it is free to pivot through an angle due to a degree of axial free play of the first bearing assembly, and further in which the bearing assembly comprises an inner race having a groove, an outer race having a groove, and a plurality of bearings located between the inner and outer races, and in which at least the outer race groove is distorted into a not round shape by applying tensile forces at spaced locations around the circumference of the outer bearing race.

As with the second aspect, the tensile forces may be applied on diametrically opposite sides of the axis of rotation of the inner race.

The outer race may deviate from a perfect round shape by between 3 and 30 micro meters.

According to a fourth aspect the invention provides a method of controlling the range of movement of a worm shaft in a gearbox assembly of the kind comprising a worm carried by a worm shaft and a wheel carried by an output shaft, the worm shaft being supported in at least one bearing, a biasing means which acts upon the worm shaft at a point distal from the bearing to bias the worm into engagement with the wheel gear, the bearing assembly supporting the worm shaft in such a manner that it is free to pivot about the bearing under the force of the biasing means, and further in which the bearing assembly comprises an inner race having a groove, an outer race having a groove, and a plurality of bearings located between the inner and outer races, the method comprising applying a force to the outer bearing such that the bearing is distorted to an oval shape with the long axis of the oval bearing generally lying in the plane in which the shaft is pivoted by the biasing means.

According to a fifth aspect the invention provides a method of controlling the range of movement of a worm shaft in a gearbox assembly of the kind comprising a worm carried by a worm shaft and a wheel carried by an output shaft, the worm shaft being supported in at least one bearing, a biasing means which acts upon the worm shaft at a point distal from the bearing to bias the worm into engagement with the wheel gear, the bearing assembly supporting the worm shaft in such a manner that it is free to pivot about the bearing under the force of the biasing means, and further in which the bearing assembly comprises a round inner race groove, an oval outer race groove, and a plurality of bearings located between the inner and outer races, and in which the outer bearing is fixed in position such that its long axis lies in the plane in which the shaft pivots.

For the avoidance of doubt, it will be understood that all of the features of the first aspect of the invention may equally be combined with the features of the other aspects of the invention. The methods of the third, fourth and fifth aspects, for example, can be applied to gearboxes in electric power assisted steering systems.

Other advantages of this invention will become apparent to those skilled in the art from the following detailed description of the preferred embodiments, when read in light of the accompanying drawings.

DETAILED DESCRIPTION OF THE INVENTION

Figure 1:
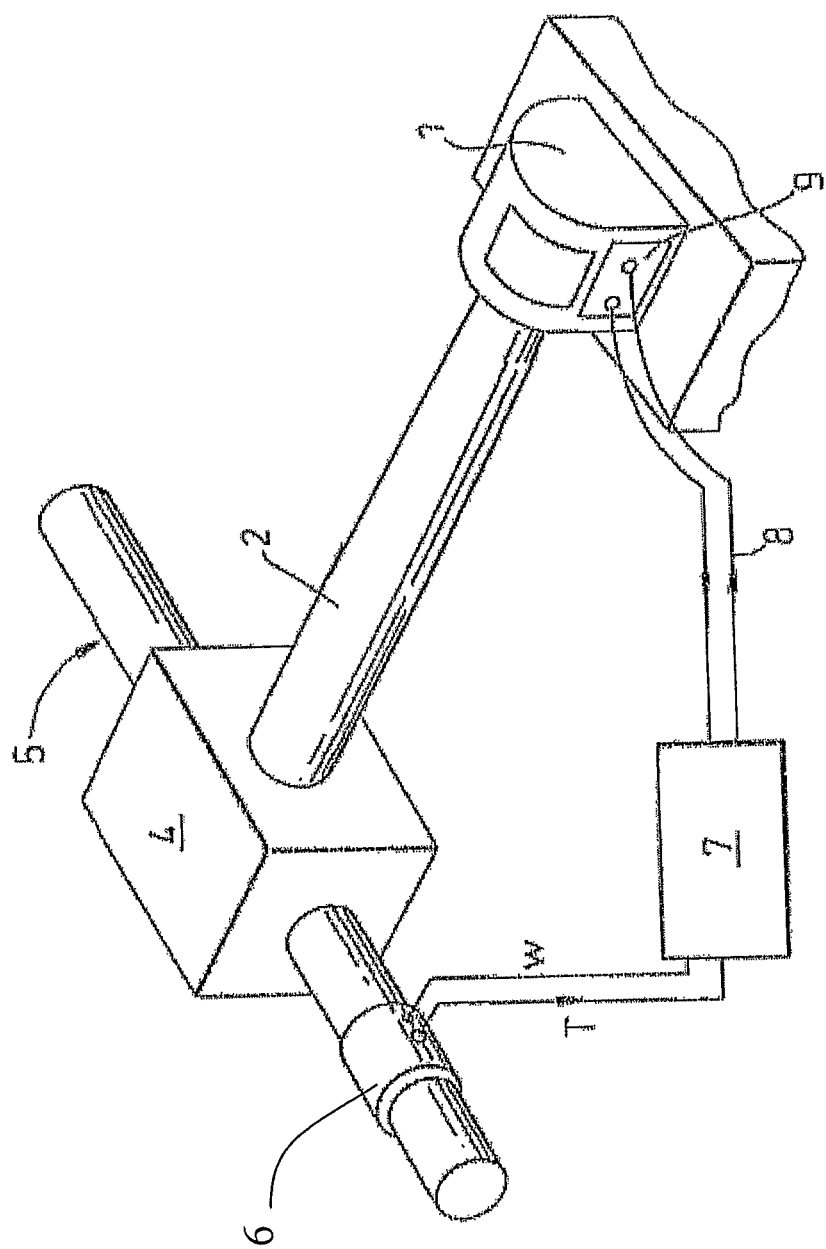
FIG. 1 is a schematic representation of the key mechanical components of an embodiment of an electric power assisted steering system.

A steering apparatus for a vehicle is shown in FIG. 1 of the accompanying drawings. The apparatus comprises an electric motor 1 which acts upon an output shaft 2 through an optional clutch 3 to a gearbox 4 of the worm and wheel type. The steering column carries a torque sensor 6 that is adapted to measure the torque carried by the steering column 5. This torque is produced by the driver turning the steering wheel. The output signal T from this sensor is fed to a signal processing means in the form of a digital signal processor 7. The signal processor generates a motor drive signal indicative of the torque required from the motor, and this signal is applied to a motor drive circuit 9 through wires 8.

Figure 2:
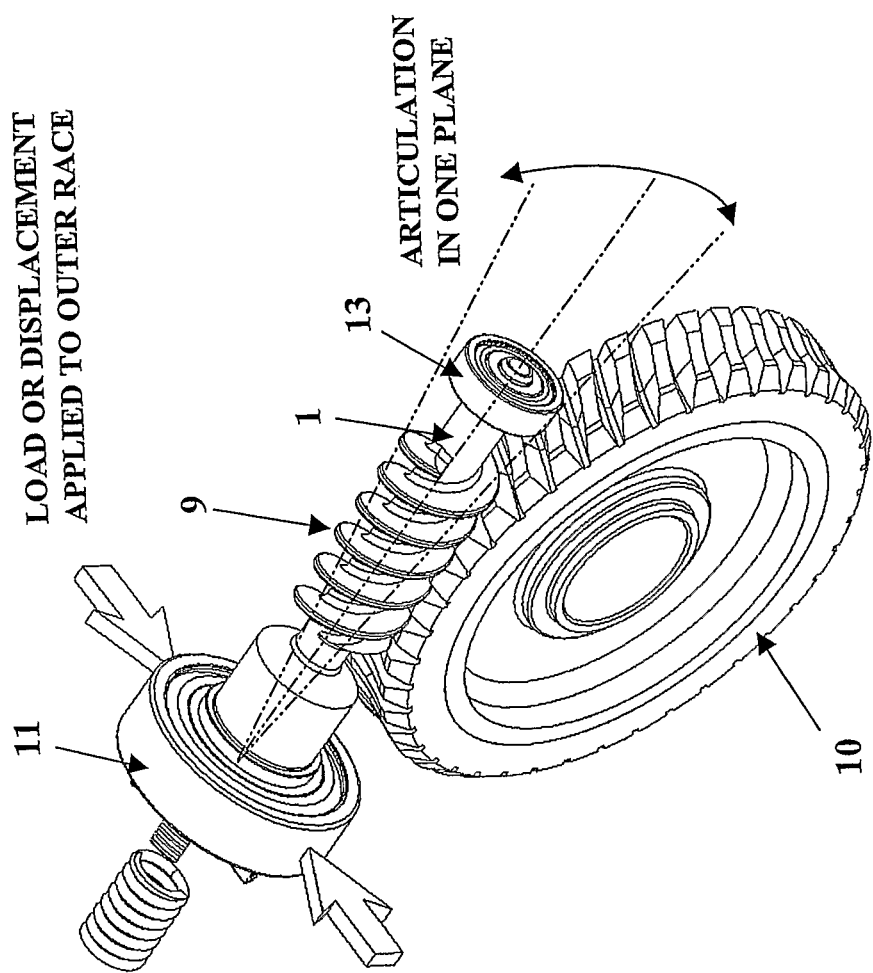
FIG. 2 is a first isometric representation of the main components of a worm and wheel gear used in the apparatus of FIG. 1 to transfer torque from an electric motor.
Figure 3:
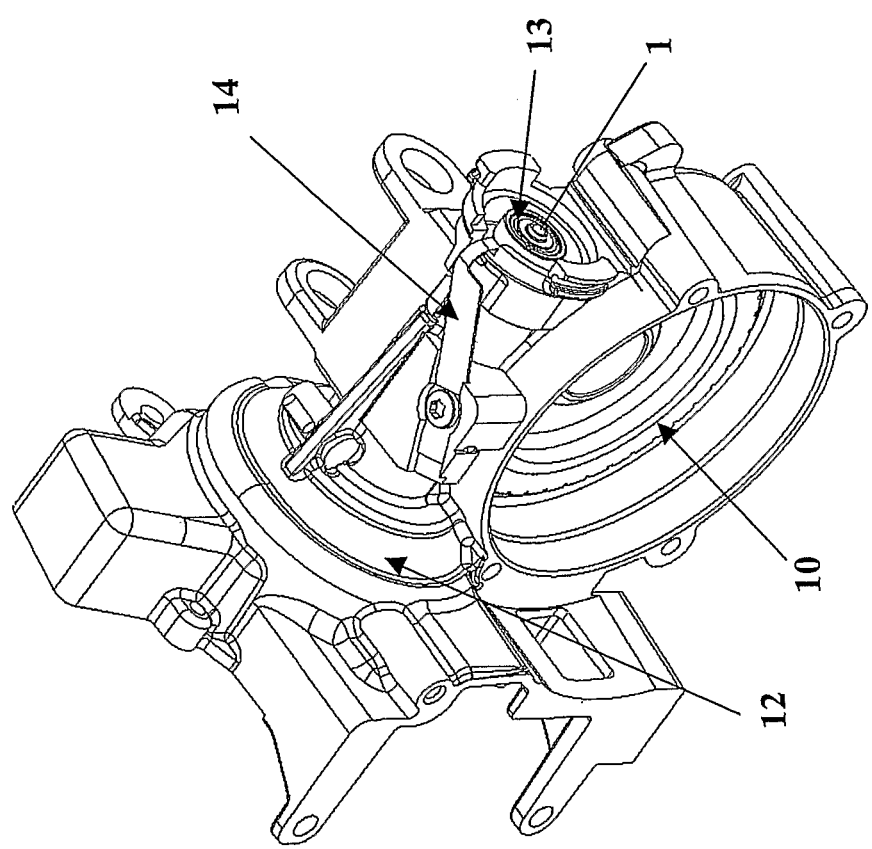
FIG. 3 is a perspective view of an embodiment of a gearbox of the type shown in FIG. 2.

The gearbox 4 is shown in more detail in FIGS. 2 and 3 of the accompanying drawings. The input shaft 1 is connected to the output of the motor, and carries a worm gear 9, and an output shaft carries a wheel gear 10. The teeth of the worm and wheel intermesh to transfer the torque from the motor 1.

The gearbox 4 is provided with an adjustable shaft centre distance, with the worm shaft 1 being spring loaded into mesh with the gear wheel 10 so that both sides (flanks) of the engaging teeth are in contact at least when zero or low torques are being transmitted.

The worm shaft 2 is secured at one end to the inner ring of a main ball bearing 11 whose outer ring is in turn supported in the gearbox housing (see 12 in FIG. 3) both axially and radially. On the opposite end of the worm shaft is fitted another, often smaller, bearing 13. This bearing is only supported radially in the housing. As shown, the main bearing 11 is at the drive-end of the worm shaft, i.e. the end which is coupled to the motor 1. The bearing 13 provides no axial control of the worm shaft. It is, however, constrained in one radial direction but has a small amount of freedom to translate in the radial direction at right angles to that. The orientation of the said latter direction is such that the worm shaft can pivot about the main bearing 11 and hence move in and out of mesh with the gear wheel 10. A leaf spring 14 shown in FIG. 3, or an equivalent resilient device, applies a load to the outer race of bearing 13 in the direction of the radial freedom, pushing the worm into mesh.

The main ball bearing 10 provides sufficient angular freedom for the worm shaft to be able to articulate (i.e. pivot about an axis parallel to the axis of the gear wheel) enough to cope with component tolerances, temperature changes and wear. This is achieved by having internal clearance between the balls and the ball grooves of bearing 11.

In the case of a standard type of deep-groove ball bearing, enabling the bearing 11 to articulate by providing internal clearance between its balls and ball grooves means that the bearing also has axial free play. This is typically approximately 0.2 mm in total. This axial clearance is itself also a source of rattle because the main bearing constrains the worm shaft axially to react the principle gear teeth contact forces. Reversal in direction of the torque transmission results in a reversal in the direction of the axial loads that in turn causes axial movement between the inner and outer races of the bearing resulting in rattle.

To limit this amount of axial free play whilst allowing some angle adjustment of the worm shaft, the applicant has appreciated that the outer bearing can be deformed to alter the characteristics of the bearing.

Figures 8A, 8B:
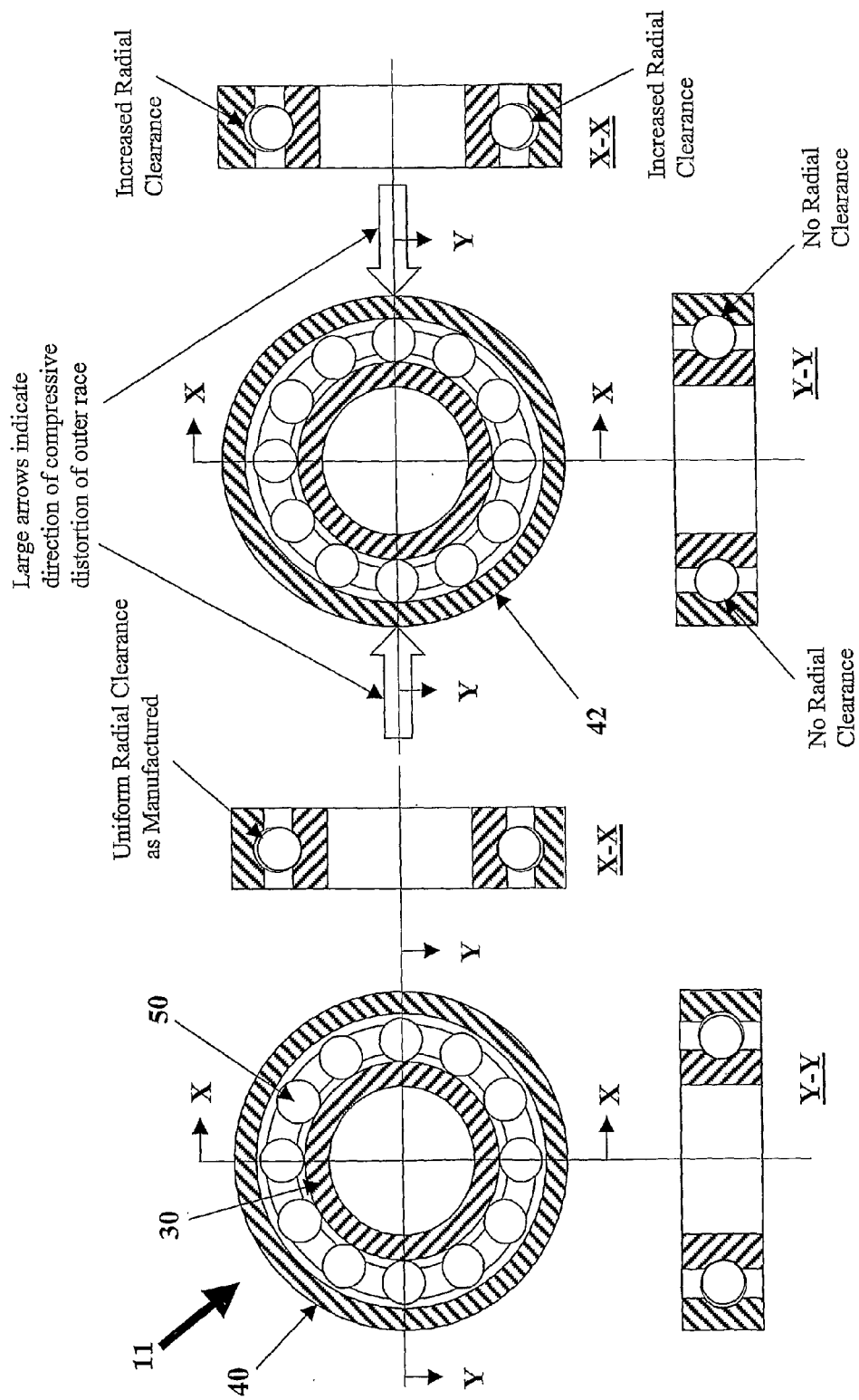
FIG. 8(a) is a view of a prior art perfectly round inner and outer bearing and FIG. 8(b) is an example of a not round outer bearing such as may be used in a steering assembly according to the present invention.

FIG. 8(a) shows a typical arrangement of inner 30 and outer 40 deep groove bearing races which receive ball bearings 50 therebetween. Both races 30, 40 comprise perfectly (or as near as possible) round bearing races that are arranged concentrically. By round we mean that a bearing following the rolling in the race in a complete path about the central axis of the bearing will describe a circular path. FIG. 8(b) shows a not round outer bearing race 42 in which the outer bearing race is in this example oval. This gives different clearances for the ball bearings at different points around the bearing. In some places the inner and outer races will be closer together than others, so the bearings have different amounts of clearance. The closer they are, the snugger the fit of the bearings in the races and so the more the bearings restrain radial and axial movement. By axial movement we mean the movement of the inner race relative to the outer race along the axis of rotation of the bearing races. By radial we mean the freedom of the inner race to move relative to the outer race in a direction radial from the shared axis of rotation.

Figure 4:
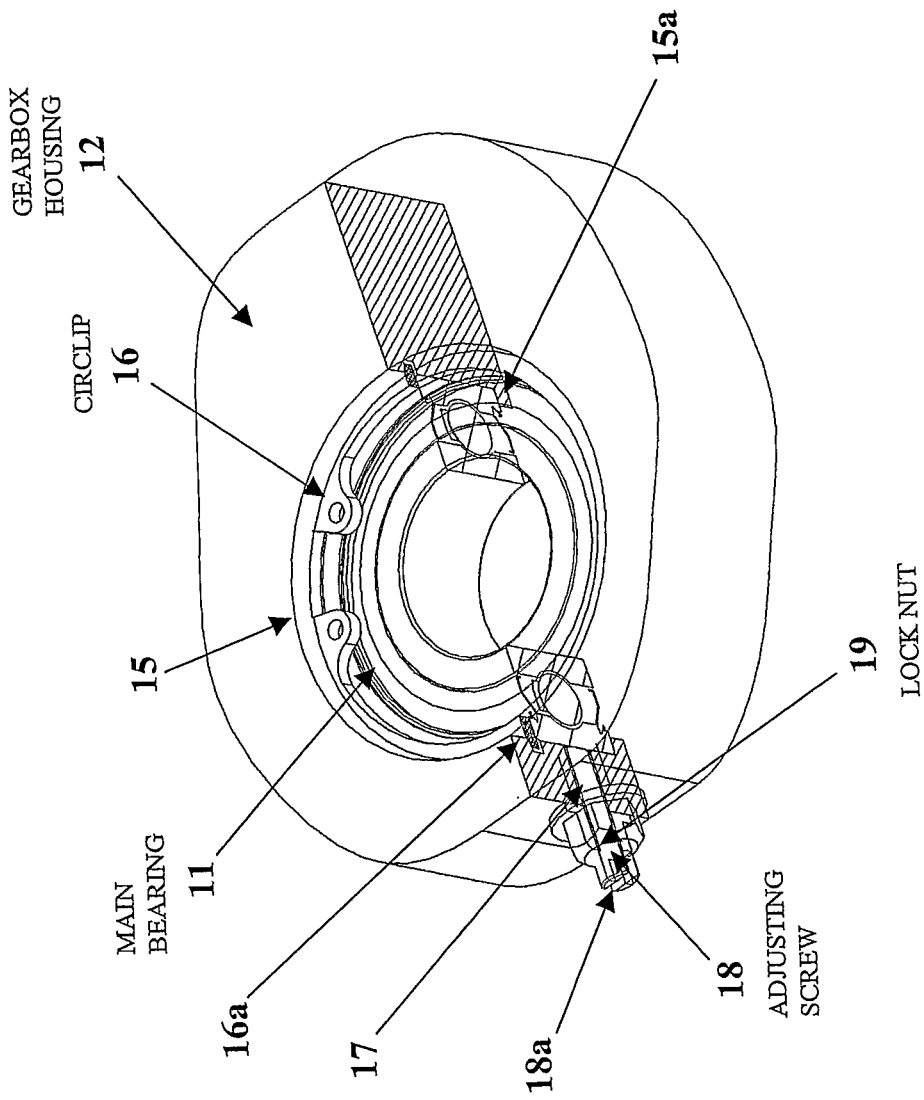
FIG. 4 is an enlarged view in part cut away of a first arrangement for locating the main bearing of the gearbox shown in FIGS. 2 and 3.

Shown in FIG. 4 of the accompanying drawings is a first arrangement by which deformation of the outer race can be achieved. The bearing 11 is inserted into an annular recess 15 formed in the gearbox housing 12 until it abuts an inwardly facing lip 15a. It is then prevented from falling out of the recess by a circlip 16 that is located in an annular groove 16a just behind the recess opening. The lip 15a and circlip 16 contact an outer race of the bearing 11 but not an inner race, which is free to rotate relative to the outer race.

A passage 17 extends from an opening in the inner wall of the recess to an outer wall of the gearbox. The passage 17 is provided with an internal thread. An elongate shaft 18 having an external thread complimentary to the internal thread of the passage 17 is inserted into the passage 17. A slot 18a is provided in its free end (the end furthest from the bearing) to allow it to be turned by a screwdriver. This is screwed down such that it starts to contact a portion of the outer face of the bearing assembly 12. The shaft 18 further can be rotated within the passage 17 which will cause it to press on the outer race. This is resisted by the portion of the recess wall diametrically opposite the passage, and the force applied to the outer race deforms it from a round to an oval shape. A lock nut 19 is then tightened down onto the exposed end of the shaft until it tightens against the outside of the gearbox housing. This prevents the shaft working loose in the passage.

Figure 5:
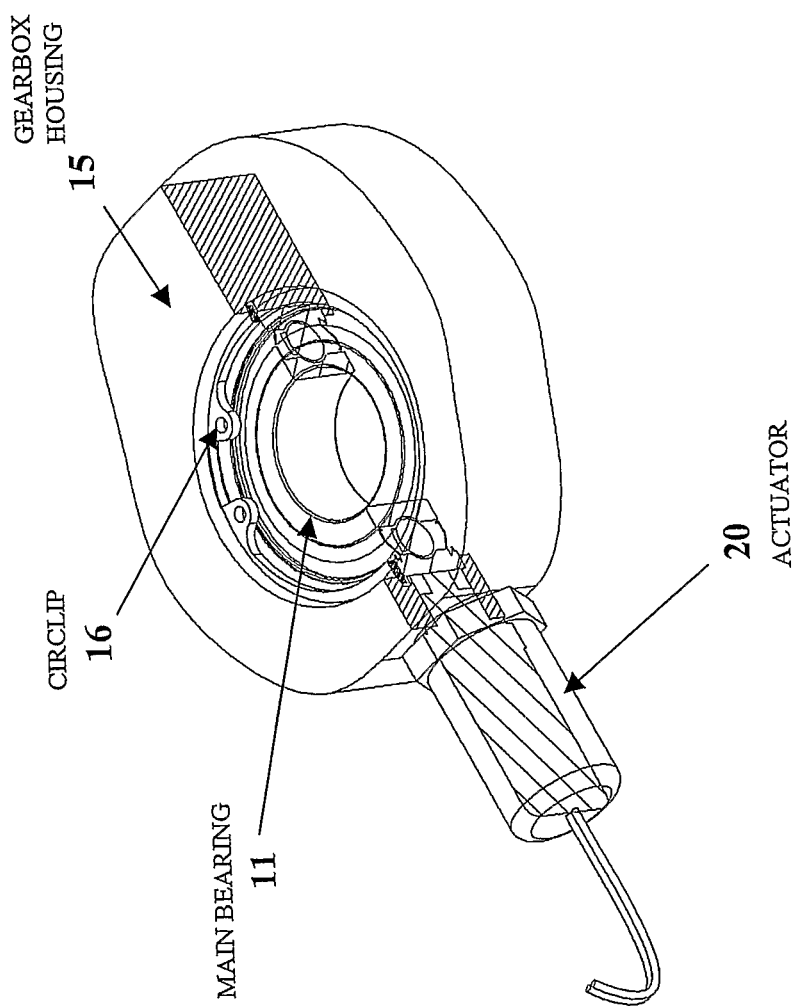
FIG. 5 is an enlarged view in part cut away of a second arrangement for locating the main bearing of the gearbox shown in FIGS. 2 and 3.

An alternative arrangement is shown in FIG. 5 of the accompanying drawings. In this arrangement, the same features as shown in FIG. 3 are indicated with the same reference numerals for clarity. The difference here is that an actuator 20 is provided which translates an applied electrical signal into an axial movement of the shaft 18. The shaft therefore may no longer have external threads and the passage may also be free of its internal thread. Of course, a similar arrangement may be envisaged in which the actuator is an electric motor that is used to turn a threaded shaft of the type shown in FIG. 4 of the drawings.

Figure 6:
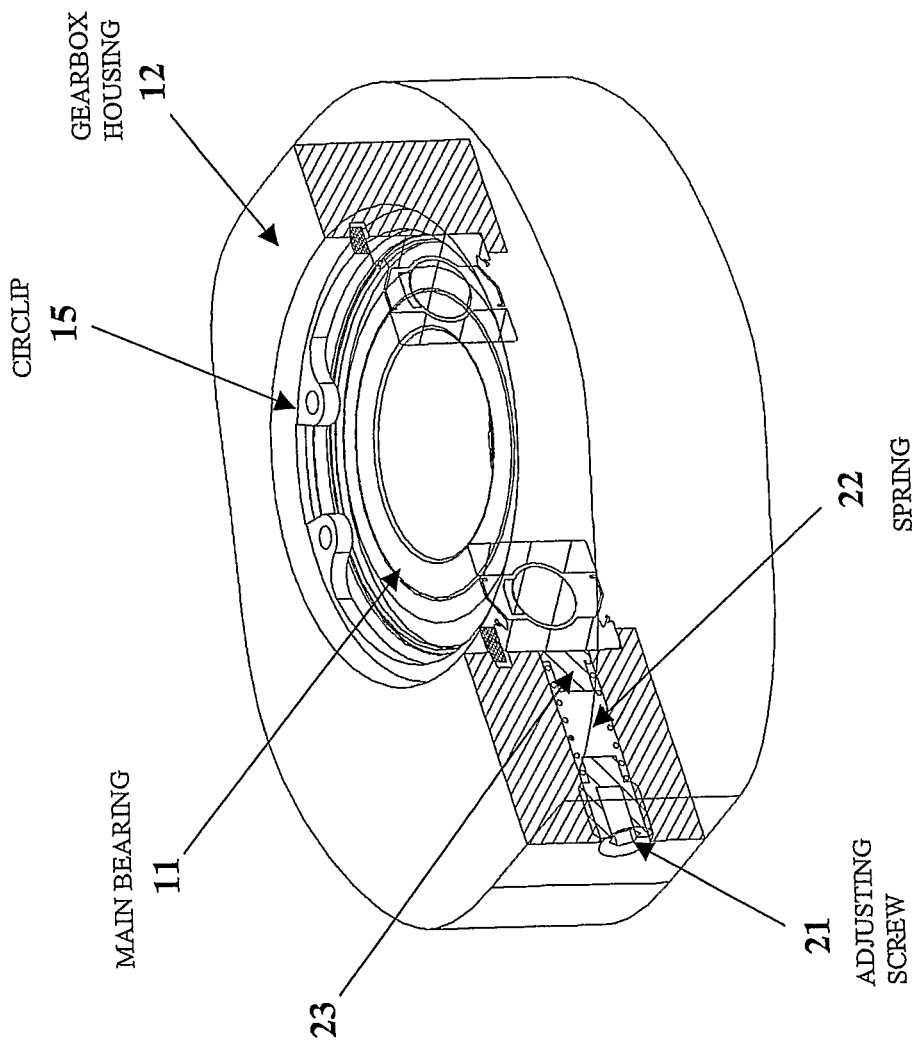
FIG. 6 is an enlarged view in part cut away of a third arrangement for locating the main bearing of the gearbox shown in FIGS. 2 and 3.

A still further alternative arrangement is illustrated in FIG. 6 of the accompanying drawings. In this arrangement, a shorter threaded shaft 21 is used which only passes part of the way into the passage 17. It abuts a coil spring 22 that is a sliding fit in the passage 17 and which in turn abuts a plunger 23. The plunger 23 is guided within the passage and contacts the outer race. The position of the shaft 21 determines how much the spring is compressed.

Figure 7:
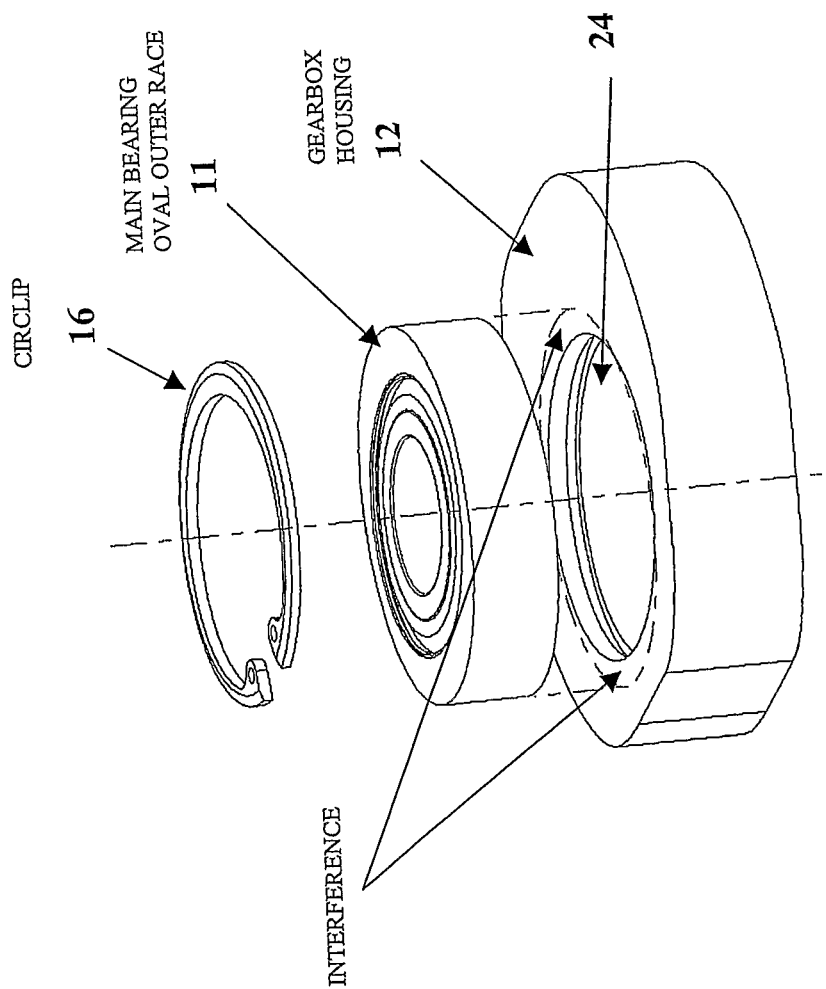
FIG. 7 is an enlarged view in part cut away of a fourth arrangement for locating the main bearing of the gearbox shown in FIGS. 2 and 3.

A still further alternative arrangement is shown in FIG. 7 of the accompanying drawings. In this simple arrangement, the passage and shaft for applying compressive forces are omitted. Instead, the outer race is deformed by forcing it into a recess 24 in the gearbox housing which is not round such that the minimum distance across the recess is less than the width across the outer race before it is inserted into the recess. By forcing it into the recess the outer face of the bearing 11 is squeezed to form the required oval shape. The dotted line in FIG. 7 shows the shape of the recess needed for the bearing to fit without deformation.

Alternatively, the arrangement in FIG. 7 could comprise an outer race whose outside diameter is not circular but whose groove is circular. The outer maybe a close fit in a circular recess 24 in the gearbox housing. By forcing the bearing 11 into the said recess the outer race is squeezed to form the required oval shape.

Both these options require the correct orientation of the outer race in the gearbox housing to ensure that the freedom to pivot is in the correct plane.

Figure 9:
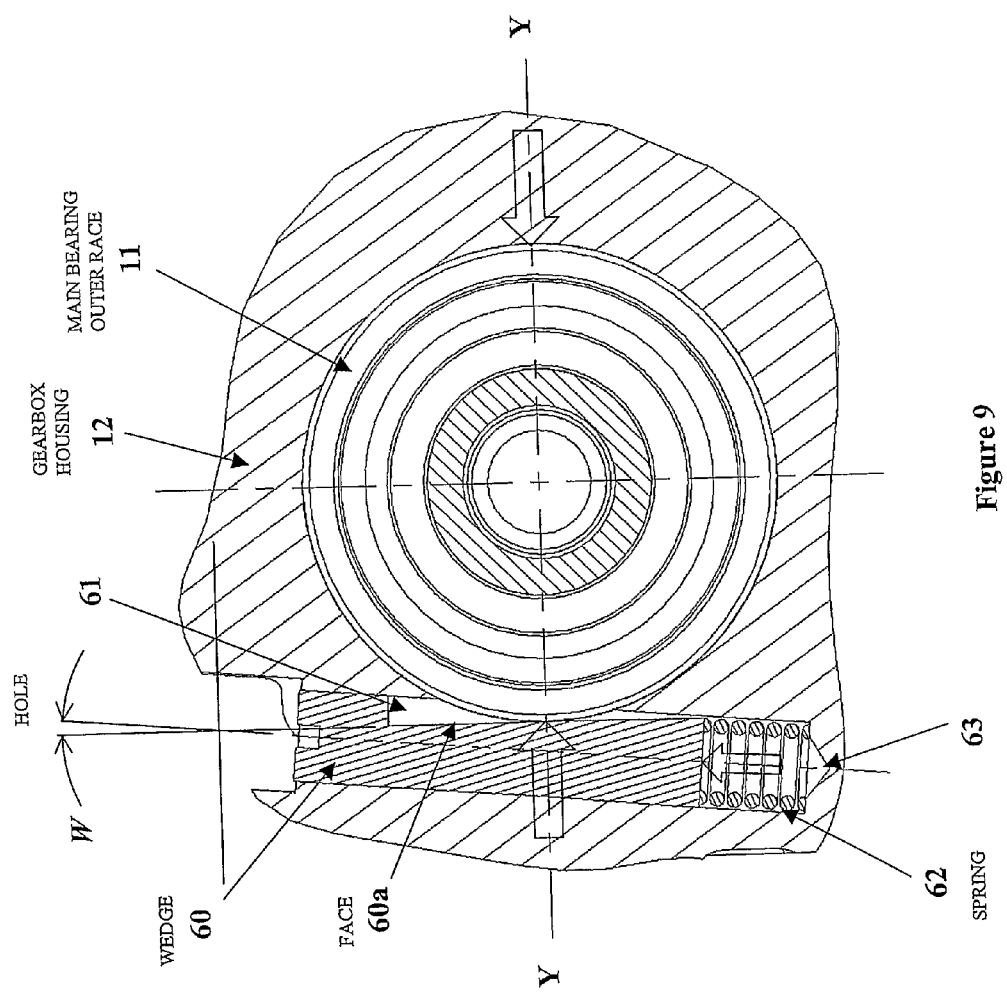
FIG. 9 is an enlarged view in a part cut away of a fifth arrangement for locating the main bearing of the gearbox shown in FIGS. 2 and 3.

A further alternative arrangement is shown in FIG. 9 of the accompanying drawings. In this, compressive forces are applied to the outer race 11 of the bearing by a compression spring 62 acting via a tapered wedge 60. The wedge 60 may comprise a round shaft into one side of which is formed a flat face 60*a* which is inclined to the axis of the shaft by an angle W. This face is pressed into contact with the outer race 11 of the main worm shaft bearing. The axis of the hole 61 in which the wedge is a sliding fit is inclined relative to the normal to the compressed axis of the bearing by an angle which is also equal or approximately equal to W. Hence the face 60*a* is normal to the compressed axis of the bearing and therefore applies a force to the outer race in the desired direction of compression. The surfaces of the wedge 60 may be lubricated by oil or grease during assembly or may be covered by a low-friction coating to ensure a low and predictable coefficient of friction of sliding of the wedge relative to the hole 61 and the bearing outer race. Hence the force which needs to be applied by the spring 62 to the wedge 60 in order to produce the desired compression force acting on the bearing outer race is minimized thus minimising the size and cost of spring required. However, it is considered desirable that the combination of the angle W and the said sliding coefficient of friction are such that any tendency for the bearing outer race to revert from an oval shape back to a round shape under to action of forces acting on the worm shaft of prevented by the jamming action of the wedge. Therefore it is considered desirable that angle W is small, for example approximately 5 degrees.

The arrangement of FIG. 9 has low costs due to there being only two additional parts, namely the wedge 60 and the spring 62, and one plain closed ended hole. In this arrangement, the sequence of assembly is to first install the spring and then the wedge. The wedge is held in a position in which the spring is over compressed while the bearing is introduced. Once the bearing is in position then the wedge can be released after which it is held in its location by acting against the outer race of the bearing thus providing the desired compression force. To minimise cost, the wedge may be formed from plastic. If the face 60*a* of the wedge tends to deform slightly, for example by indenting at its point of contact with the bearing, it will be propelled further along the hole by the spring and the compression force will be maintained. It is desirable that the spring 62 has a relatively low stiffness in order to minimise variations in the force acting on the bearing which arise due to variations in the position of the wedge along the hole.

It is desirable that the means of retaining the main bearing outer race in the gearbox housing prevents free play parallel to the worm shaft axis but still allows the outer race to arrive at the desired oval shape. It is known from testing that when severe shock loads act on the worm shaft the bearing outer race may revert from an oval shape back to a round shape momentarily. It is important that when this occurs, the said bearing outer race retaining means does not prevent the spring from restoring the outer race to the desired oval shape. In other words it must locate the outer ring without lash in the housing but without applying excessive grip. One preferred means is to use a bevelled circlip.

Figure 10:
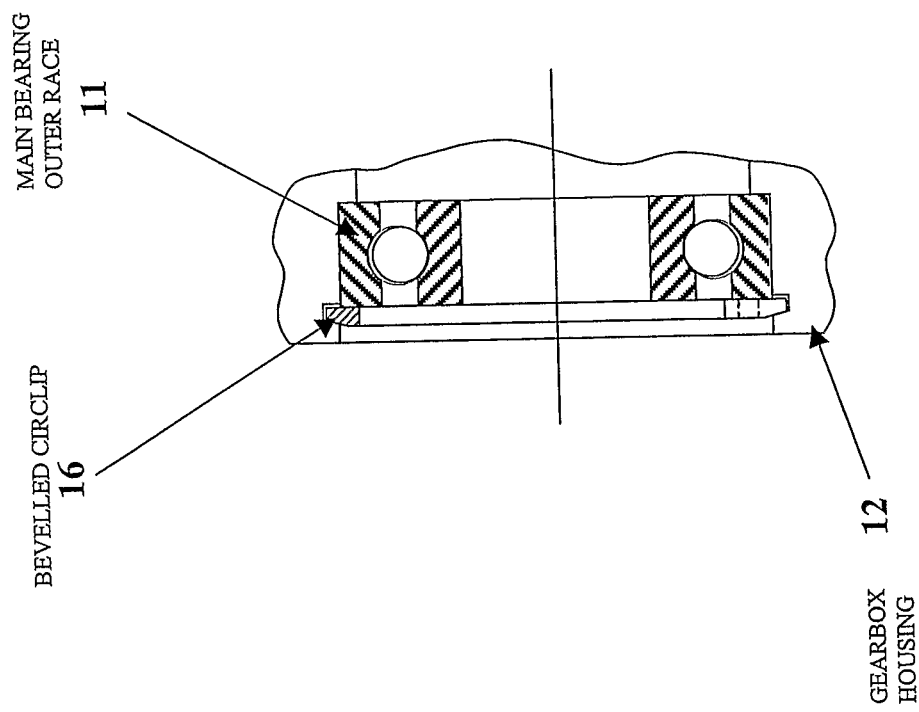
FIG. 10 is an enlarged view in part cut away of a generic arrangement for axially locating the main bearing of the gearbox shown in FIGS. 2 and 3.

FIG. 10 shows a cross section through the main bearing 11 and a bevelled circlip 16. The circlip 16 has an inclined conical face formed in one of its side faces and this engages with a similarly inclined conical face on one side of the groove in the gearbox housing 12. Upon assembly into the groove, the circlip expands until there is no axial gap between its inclined face and that of the groove nor between its vertical face and that of the bearing. Hence axial free play is eliminated while the gripping force between the circlip and the outer race of the bearing is limited to that which derives from the elastic behaviour of the circlip. The said limited gripping force does not prevent the outer race of the bearing from adopting the desired oval shape when acted on by the spring 62 and the wedge 60 shown in FIG. 9.

Figure 11:
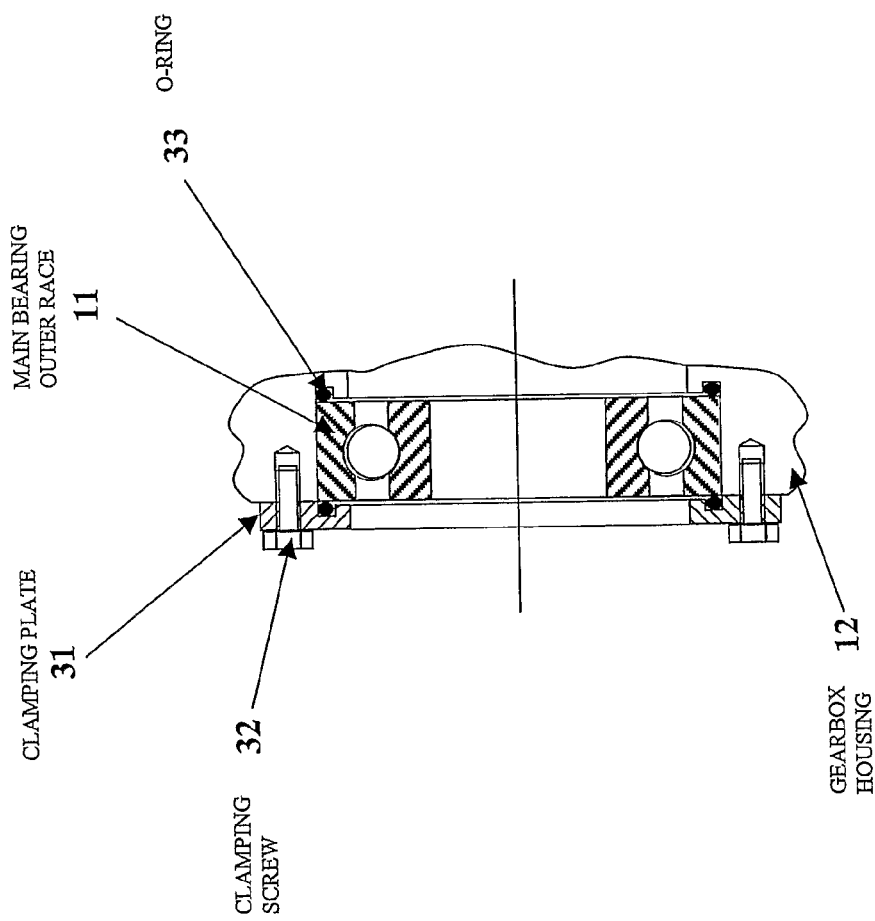
FIG. 11 shows an alternative arrangement for axially locating the main bearing.

FIG. 11 shows an alternative bearing retention arrangement to that of FIG. 10 which addresses the same objectives. In this the main bearing 11 is retained in the gearbox housing 12 by a clamping plate 31 which is itself attached to the gearbox housing by a plurality of clamping screws 32. Conventionally the clamping plate would bear directly onto end face of the main bearing outer race 11. However, it is known from testing that the friction thus created between the outer ring 11 and the clamping plate 31 on the one side and the friction created between the outer ring 11 and the gearbox housing on the other side are sufficient to prevent the main bearing outer race from adopting the desired oval shape should it be momentarily deformed from said desired shape under the influence of a shock load. In the arrangement of FIG. 11 the main bearing outer race 11 is held between a pair of compressed elastomeric O-rings 33. These O-rings are able to stiffly support axial forces acting on the bearing with little further compression but which allow small changes of shape of the outer race from oval to round and back by a combination of rolling and shear deformation of the O-ring cross sections.

Figure 12:
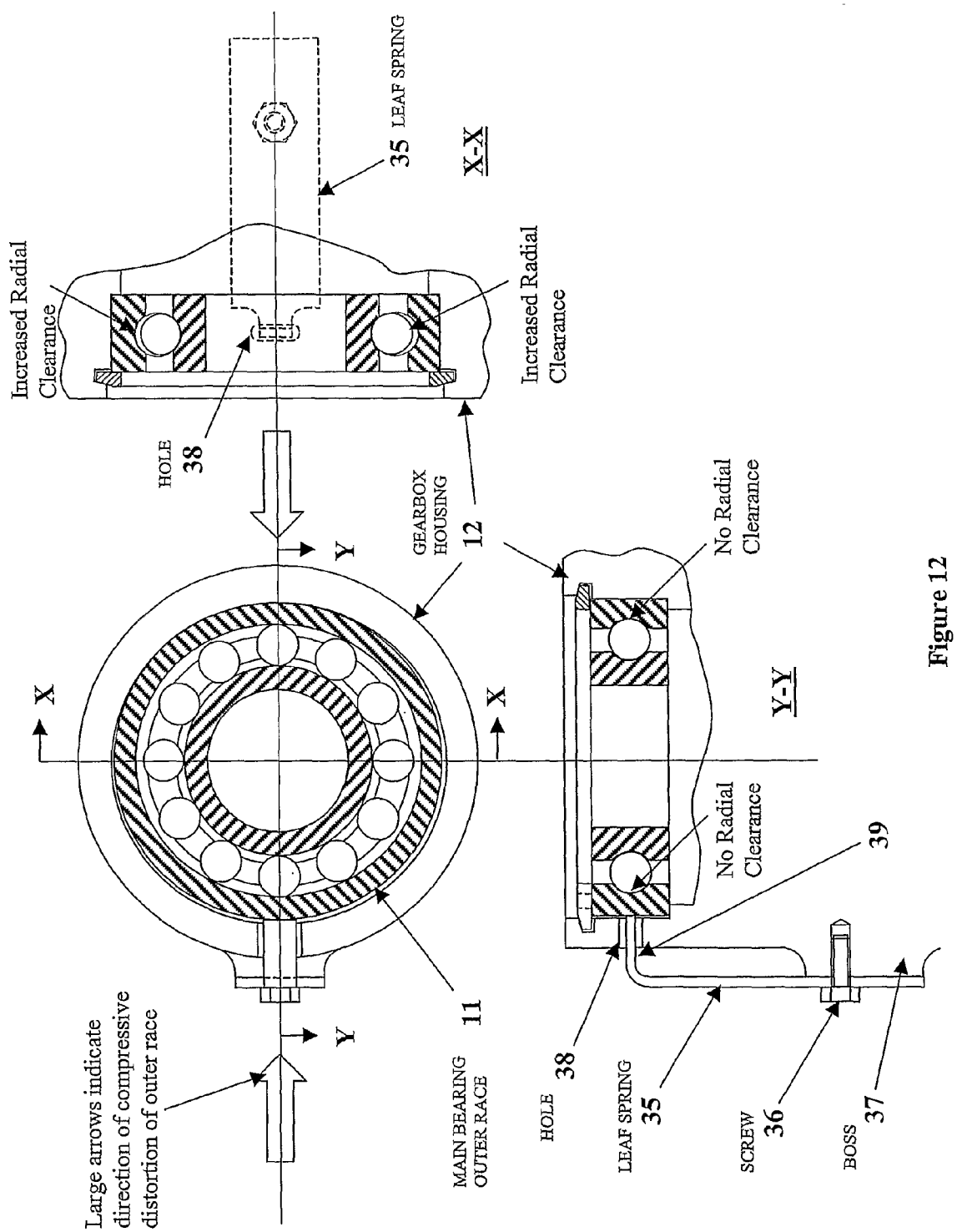
FIG. 12 is a view of a still further alternative arrangement for locating the main bearing.

A still further bearing deformation arrangement is illustrated in FIG. 12 of the accompanying drawings. In this arrangement a compression force is applied to the main bearing outer race 11 via a leaf spring 35 which is fixed to the gearbox housing 12 by one or more screws 36. One end 39 of the leaf spring is formed to pass through a hole 38 in the housing and to bear onto the outer race 11. The shape of the leaf spring 35 before assembly to the gearbox 12 is such that it is deformed during tightening of the screw or screws 36 in the housing boss 37 and thereby creates the desired contact force between the end 39 and the outer race 11. This arrangement is more compact than that shown in FIG. 6 in terms of the radial distance from the bearing that is required to accommodate the resilient means namely the spring. Therefore it may be advantageous in some applications where available space in the said radial direction is limited. Referring to view X-X in FIG. 12 it permissible to place the leaf spring 35 in any orientation which best suits the space available in the application provided that the end 39 protrudes through the housing 12 via a suitable hole 38.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. An electric power assisted steering system of the kind in which a motor is connected to a portion of a steering mechanism through a worm carried by a worm shaft and a wheel carried by an output shaft operatively coupled to the steering mechanism, the shaft being supported in at least one bearing assembly, in which the bearing assembly has some internal clearances supports the worm shaft in such a manner that it is free to pivot through an angle in planes which include its own axis due to a degree of axial free play of the bearing assembly, and further in which the bearing assembly comprises an inner race having a groove, an outer race having a groove, and a plurality of ball bearings located between the inner and outer races, and in which the inner race groove defines an inner ball bearing path which is round and the outer race groove defines an outer ball bearing path which is not round, wherein along a central axis of the bearing assembly and between the ball bearings and at least the outer race groove there is defined at least a first radial clearance and at least a second radial clearance which is greater than the first radial clearance for the ball bearings at different points around the bearing assembly such that the ball bearings permit a greater freedom of movement of the inner race relative to the outer race in a first radial direction than in a second radial direction that is orthogonal to the first direction.

2. The electric power assisted steering system according to claim 1 in which the bearing assembly comprises a single race deep ball groove ball bearing.

3. The electric power assisted steering system according to claim 1 in which the outer race, in the position of use, adopts an eccentric shape whilst the inner race remains substantially circular, the races being arranged about a common axis.

4. The electric power assisted steering system according to claim 3 in which the eccentric shape is oval.

5. The electric power assisted steering system according to claim 1 in which the groove of the outer race deviates radially from a perfect round shape by between 3 and 30 micro meters depending on what are the radial clearances that exist between the balls and the races when the outer race of the same circumferential length is constrained to be a perfect circular shape.

6. The electric power assisted steering system according to claim 1 in which the groove of the outer race is oval and has a long axis thereof lying in the same plane in which the shaft moves when pivoting.

7. The electric power assisted steering system according to claim 1 in which the outer race is flexible and is generally circular prior to use and is distorted when in use by applying forces thereto.

8. The electric power assisted steering system according to claim 7 which further includes an adjustment means that is adapted to adjust the eccentricity of the outer bearing.

9. The electric power assisted steering system according to claim 8 in which the adjustment means is adapted to squeeze the opposing sides of the outer race together, the outer race being fitted within a bore of a housing, the bore having an inner wall, and the adjustment means acting between the housing and a portion of the outer race so as to compress the outer race onto the wall of the bore.

10. The electric power assisted steering system according to claim 7 in which the adjustment means comprise a force applying means.

11. The electric power assisted steering system according to claim 10 in which the force applying means comprises a screw threaded in a bore.

12. The electric power assisted steering system according to claim 10 in which the force applying means comprises a spring.

13. The electric power assisted steering system according to claim 10 in which the force applying means comprises at least one wedge located within a blind bore which is biased into engagement with the bearing by a spring acting between the bore and the wedge.

14. The electric power assisted steering system according to claim 1 in which the outer bearing race is squeezed by locating the bearing in a recess which is so dimensioned that the recess deforms the bearing.

15. The electric power assisted steering system according to claim 1 in which the outer race of the bearing assembly is flexible and in which opposing portions of the outer race are drawn apart such as to distort the outer race into a non round form.

16. An electric power assisted steering system of the kind in which a motor is connected to a portion of a steering mechanism through a worm carried by a worm shaft and a wheel carried by an output shaft operatively coupled to the steering mechanism, the shaft being supported in at least one bearing, in which the bearing assembly supports the worm shaft in such a manner that it is free to pivot through an angle due to a degree of axial free play of the first bearing assembly, and further in which the bearing assembly comprises an inner race having a groove, a flexible outer race having a groove, and a plurality of ball bearings located between the inner and outer races, and in which at least the groove of the outer race is distorted into a not round shape by applying compressive forces at spaced locations around the circumference of the outer bearing race, wherein along a central axis of the bearing assembly and between the ball bearings and at least the groove of the outer race there is defined at least a first radial clearance and at least a second radial clearance for the ball bearings at different points around the bearing assembly such that the ball bearings permit a greater freedom of movement of the inner race relative to the outer race in a first radial direction than in a second radial direction that is orthogonal to the first direction.

17. An electric power assisted steering system of the kind in which a motor is connected to a portion of a steering mechanism through a worm carried by a worm shaft and a wheel carried by an output shaft, the worm shaft being supported in at least one bearing, in which the bearing assembly supports the worm shaft in such a manner that it is free to pivot through an angle due to a degree of axial free play of the first bearing assembly, and further in which the bearing assembly comprises an inner race having a groove, an outer race having a groove, and a plurality of ball bearings located between the inner and outer races, and in which at least the outer race groove is distorted into a not round shape by applying tensile forces at spaced locations around the circumference of the outer bearing race, wherein along a central axis of the bearing assembly and between the ball bearings and at least the outer race groove there is defined at least a first radial clearance and at least a second radial clearance for the bearings at different points around the bearing assembly such that the ball bearings permit a greater freedom of movement of the inner race relative to the outer race in a first radial direction than in a second radial direction that is orthogonal to the first direction.

18. A method of controlling the range of movement of a worm shaft in a gearbox assembly of the kind comprising a worm carried by the worm shaft and a wheel carried by an output shaft, the worm shaft being supported in at least one bearing, a biasing means which acts upon the worm shaft at a point distal from the bearing to bias the worm into engagement with the wheel gear, the bearing assembly supporting the worm shaft in such a manner that it is free to pivot about the bearing under the force of the biasing means, and further in which the bearing assembly comprises an inner race having a groove, an outer race having a groove, and a plurality of ball bearings located between the inner and outer races, the method comprising applying a force to the outer race such that the outer race is distorted to an oval shape with the long axis of the oval outer race generally lying in the plane in which the shaft is pivoted by the biasing means to thereby provide different clearances for the ball bearings at different points between the grooves of the oval shape of outer race and a round shape of the inner race around the bearing assembly such that the ball bearings permit a greater freedom of movement of the inner race relative to the outer race in a first radial direction than in a second radial direction that is orthogonal to the first direction.

19. A method of controlling the range of movement of a worm shaft in a gearbox assembly of the kind comprising a worm carried by the worm shaft and a wheel carried by an output shaft, the worm shaft being supported in at least one bearing, a biasing means which acts upon the worm shaft at a point distal from the bearing to bias the worm into engagement with the wheel gear, the bearing assembly supporting the worm shaft in such a manner that it is free to pivot about the bearing under the force of the biasing means, and further in which the bearing assembly comprises a round inner race groove, an oval outer race groove, and a plurality of ball bearings located between the inner and outer races, and in which the outer bearing is fixed in position such that its long axis lies in the plane in which the shaft pivots, in which the method comprises the step of providing along a central axis of the bearing assembly and between the ball bearings and at least the oval outer race groove at least a first radial clearance and at least a second radial clearance for the ball bearings at different points around the bearing assembly such that the ball bearings permit a greater freedom of movement of the inner race relative to the outer race in a first radial direction than in a second radial direction that is orthogonal to the first direction.

* * * * *